United States Patent
Chen et al.

(10) Patent No.: US 7,991,283 B2
(45) Date of Patent: Aug. 2, 2011

(54) GEOTAGGING PHOTOGRAPHS USING ANNOTATIONS

(75) Inventors: Billy Chen, Bellevue, WA (US); Eyal Ofek, Redmond, WA (US); Pragyana K. Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 12/242,739

(22) Filed: Sep. 30, 2008

(65) Prior Publication Data

US 2010/0080551 A1    Apr. 1, 2010

(51) Int. Cl.
G03B 17/24    (2006.01)
(52) U.S. Cl. ...................................... 396/310
(58) Field of Classification Search .............. 396/306, 396/310, 315–318
See application file for complete search history.

(56) References Cited

U.S. PATENT DOCUMENTS

| | | | |
|---|---|---|---|
| 5,296,884 A * | 3/1994 | Honda et al. | 396/311 |
| 5,802,492 A * | 9/1998 | DeLorme et al. | 455/456.5 |
| 6,282,362 B1 * | 8/2001 | Murphy et al. | 386/46 |
| 7,827,507 B2 * | 11/2010 | Geise et al. | 715/850 |
| 2006/0110154 A1 * | 5/2006 | Hulsen et al. | 396/310 |
| 2008/0010605 A1 | 1/2008 | Frank | |
| 2008/0040071 A1 * | 2/2008 | McKitterick | 702/159 |
| 2008/0052372 A1 | 2/2008 | Weber et al. | |
| 2008/0092054 A1 | 4/2008 | Bhumkar et al. | |
| 2009/0171568 A1 * | 7/2009 | McQuaide, Jr. | 701/206 |
| 2009/0280824 A1 * | 11/2009 | Rautiainen | 455/456.1 |
| 2009/0324211 A1 * | 12/2009 | Strandell et al. | 396/310 |
| 2010/0131532 A1 * | 5/2010 | Schultz | 707/758 |

OTHER PUBLICATIONS

Torniai, et al., "Sharing, Discovering and Browsing Geotagged Pictures on the Web," http://www.hpl.hp.com/personal/Steve_Cayzer/downloads/papers/geospatial_final.pdf.
Andrew, "Geotagging with Microsoft Expression Media 2," Microsoft Corporation 2008, http://www.microsoft.com/prophoto/expressionmedia2/articles/geotagging.aspx.
Elgan, "You Can't Hide; 'Geotagging' Will Find You," Media G8way Corp., 2006, http://www.mediag8way.com/?_s=26&_ss=P&P=3&PN=3904&L=S&II=289&ID=S,289,AP,1-9.
Naaman, "Eyes on the World," http://www.computer.org/portal/site/computer/menuitem.5d61c1d591162e4b0ef1bd108bcd45f3/index.jsp?&pName=computer_level1_article&TheCat=1080&path=computer/homepage/1006&file=invisible.xml&xsl1=article.xsl&;jsessionid=L0YLmFThG6clIJQJYZPxZPLbVKLbp0J4M1IRrjBkGDOLP1fDnbZv!1687608712.
"GPSPhotoLinker, Leopard Update," Jeffrey J. Early 2004-2006, http://oregonstate.edu/~earlyj/gpsphotolinker/index.php.
Jaffe et al., "Generating Summaries and Visualization for Large Collections of Geo-Referenced Photographs," http://www.cs.washington.edu/homes/ajaffe/mir609-jaffe.pdf.
Ahern et al., "World Explorer: Visualizing Aggregate Data from Unstructured Text in Geo-Referenced Collections," http://www.yahooresearchberkeley.com/blog/wp-content/uploads/2007/04/JCDL07-ahern-WorldExplorer.pdf.

* cited by examiner

Primary Examiner — Clayton E Laballe
Assistant Examiner — Warren K Fenwick
(74) Attorney, Agent, or Firm — Michael E. Kondoudis; The Law Office of Michael E. Kondoudis (57) ABSTRACT

Labels of elements in images may be compared to known elements to determine a region from which an image was created. Using this information, the approximate image position can be found, additional elements may be recognized, labels may be checked for accuracy and additional labels may be added.

20 Claims, 5 Drawing Sheets

GEOTAGGING PHOTOGRAPHS USING ANNOTATIONS

BACKGROUND

This Background is intended to provide the basic context of this patent application and it is not intended to describe a specific problem to be solved.

Tagging photographs with names and places is becoming common. This data is useful to users as the tags may help user recall things in the photos. Oftentimes these tags refer to the photo as a whole. For example, a photograph taken from the Empire State Building may be tagged with "Empire State Building" and "New York". More recently, users are tagging not only the entire photograph but also subimages. In the previous example, a user may annotate the photo with the tag "Central Park," along with an outline indicating where it is in the photo. We call such tags annotations, and describe contributions that exploit them. An annotation is a tag with an associated region of interest in a photo. The tag may be text or other media such as audio, video, etc.

Another source of tags maybe objects that can be recognized automatically in the image: A fast food restaurant logo, a known landmark ("statue of liberty"), a water body, etc. The above description may use a mix of user tagged annotations & matched points.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system for geotagging photographs using annotations is disclosed. The blocks may include reviewing an image for a plurality of labeled elements including a labeled or annotated element and an additional label element. A known element data store may be evaluated to determine whether a known element in the known element data store is sufficiently similar to the labeled element. If the data store contains a sufficiently similar known element to the labeled element, the global position of the known element may be obtained.

The additional labeled element may be compared to the known element data store to determine if a sufficiently similar additional known element to the additional labeled element is in the data store. If a sufficiently similar element to the additional labeled element is in the known element data store, the global position of the additional known element may be obtained. The global position of the known element and the additional known element may be evaluated to determine an image region where the image region may be a geographic area from which the image was created.

It may be determined whether the labeled element and additional labeled element are accurately labeled by evaluating the relative global position of the known element and the additional known element from the image capturing both elements. If the labeled element and additional labeled element are accurately labeled, the image may be stored as an approved tagged image.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
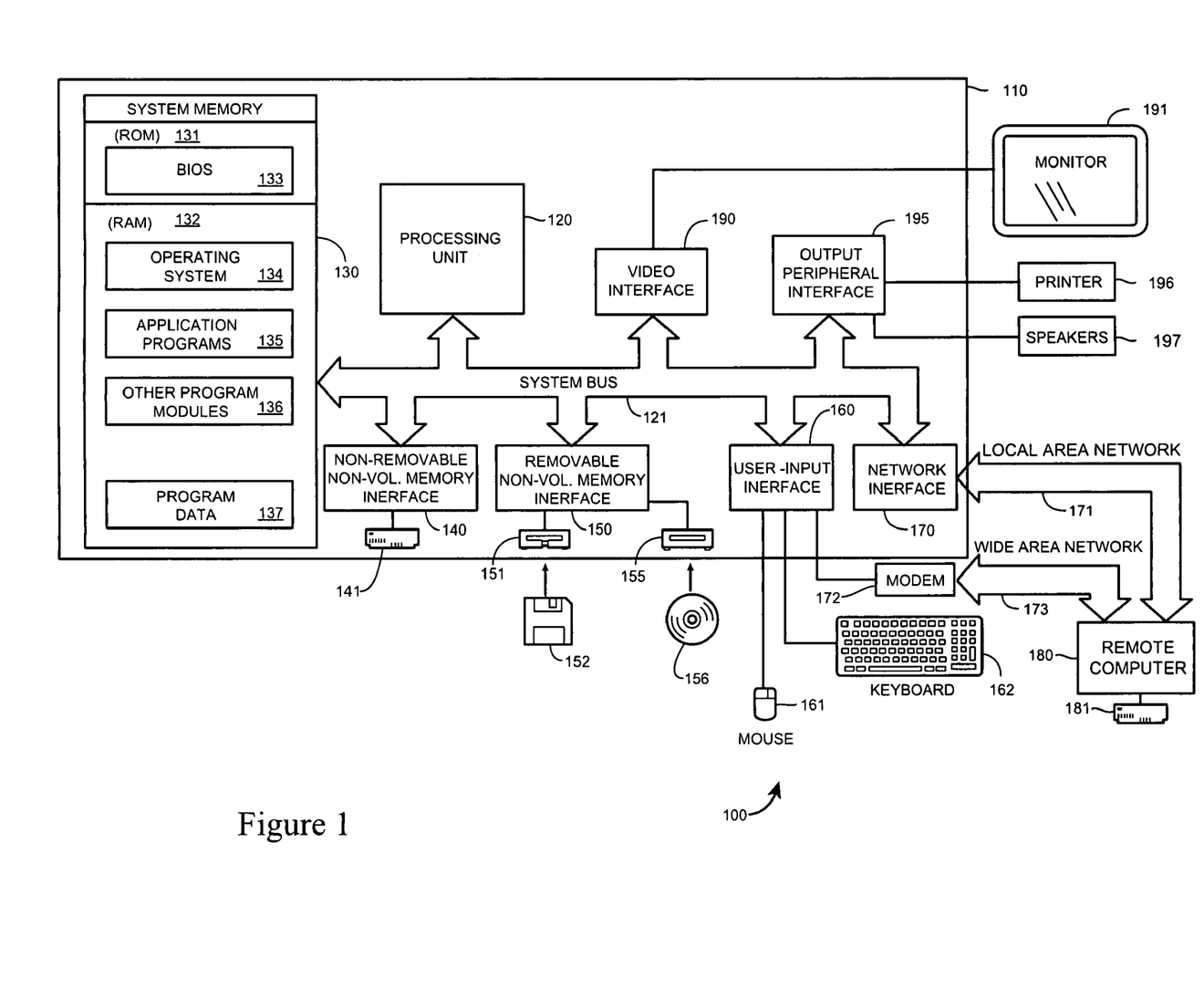
FIG. 1 is an illustration of a portable computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM)

132. The ROM may include a basic input/output system 133 (BIOS). RAM 132 typically contains data and/or program modules that include operating system 134, application programs 135, other program modules 136, and program data 137. The computer 110 may also include other removable/ non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
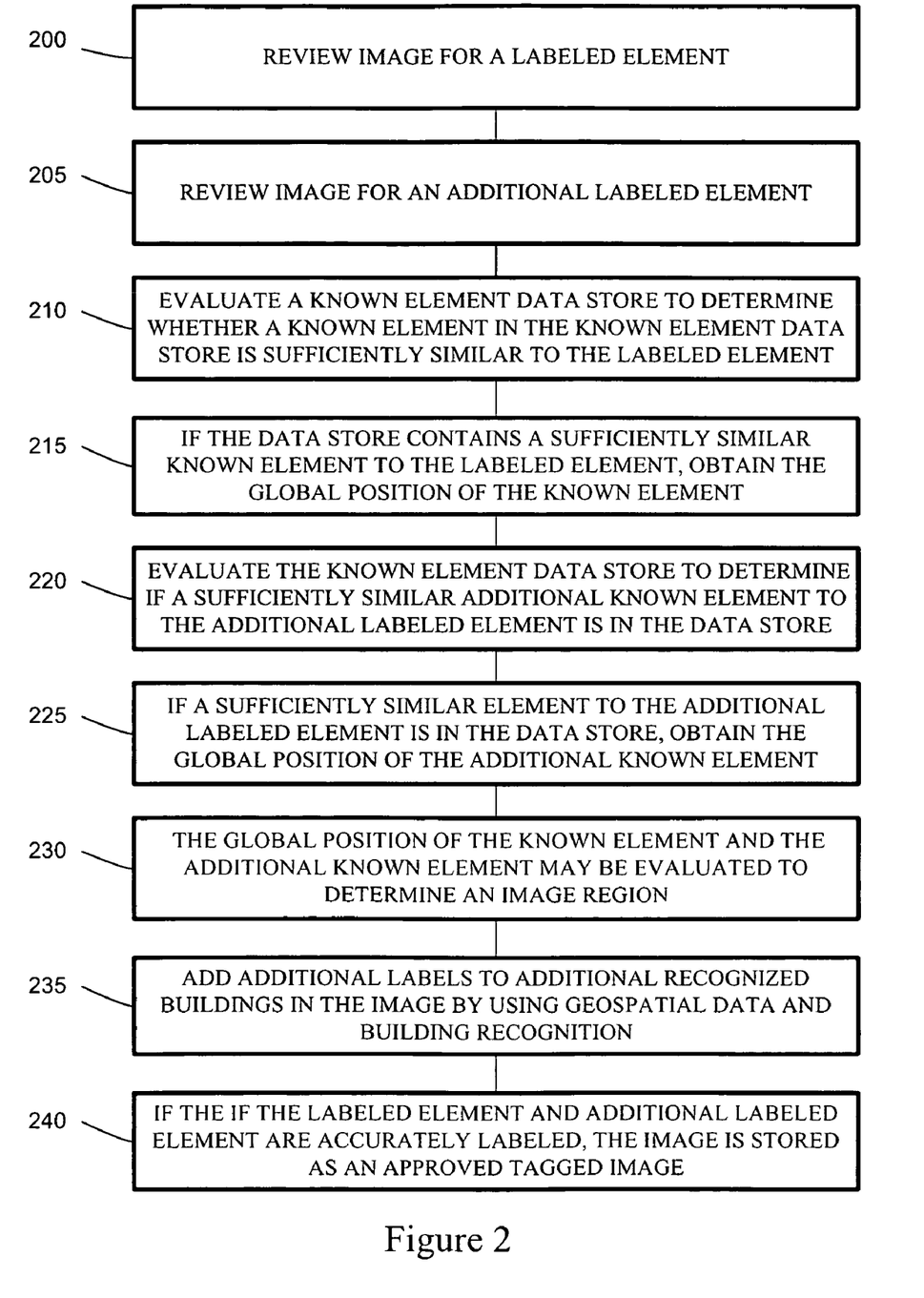
FIG. 2 is an illustration of a method of geotagging an image using annotations
Figure 3:
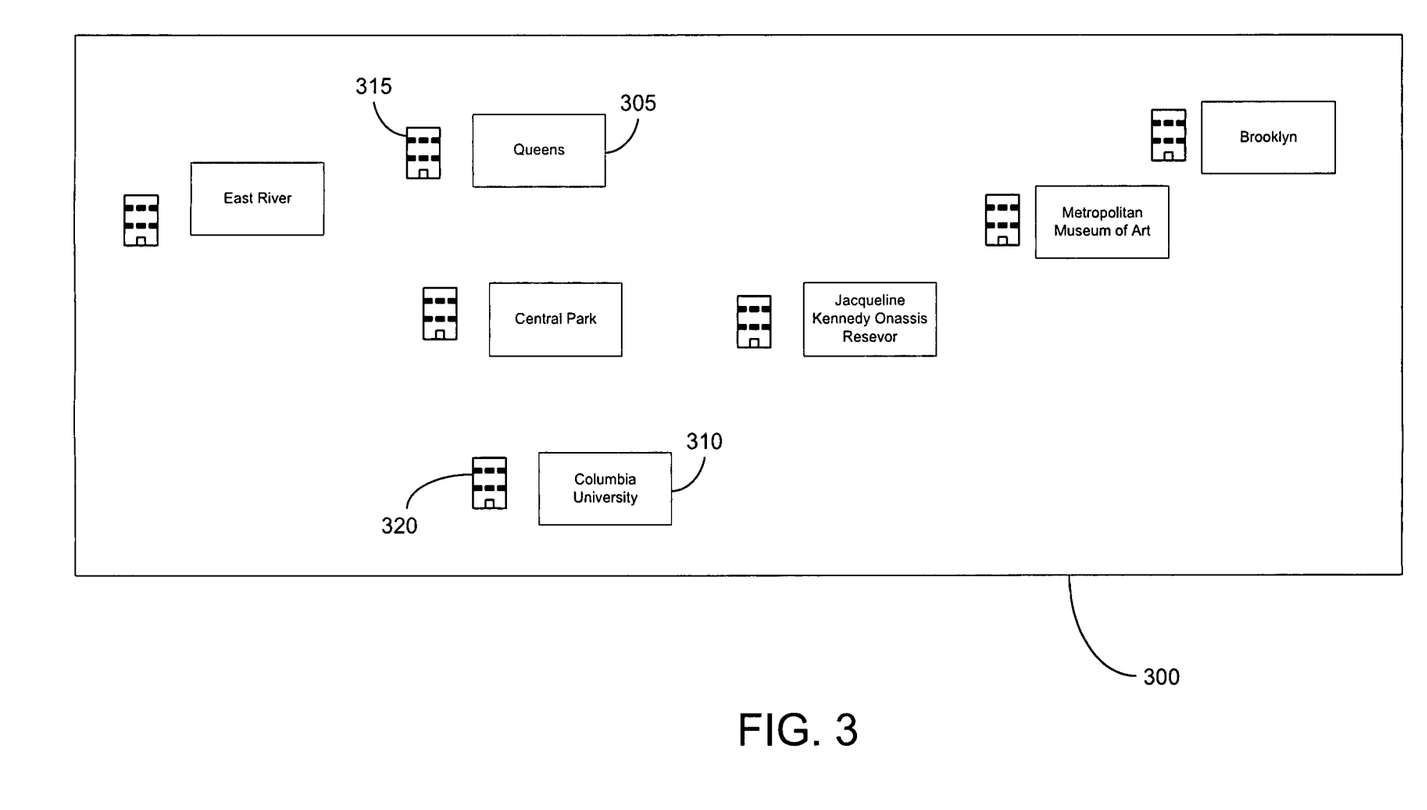
FIG. 3 is an illustration of an image with geotags.

FIG. 2 may illustrate a method of geotagging images using annotations that may be implemented on the computing system describe in FIG. 1. Recent advances have permitted users or applications to add geotags to images such as photos or illustrations. In general, tags may serve virtually any purpose. Geotags may be a more specific type of tag that relates to geography in a photo or other illustration. Some examples of geotags (and not limitations) include building names (Sears Tower), street names (Michigan Ave.), park names (Millennium Park), transportation elements (BNSF train tracks), names for water features (Chicago River), etc. The number and variation of geotags is virtually limitless as are the geographic feature of Earth or any other planet. FIG. 3 may illustrate an image 300 with labels or geotags 305, 310 applied to elements 315, 320. Geotags or labels 305 310 may be applied to elements 315 320 and elements 315 320 may be street signs, buildings, billboards, cars, transportation elements, buildings, parks, bodies of water, golf course, etc. Some geo tags may be recognized automatically, such as stores signs or famous landmarks.

Figure 4:
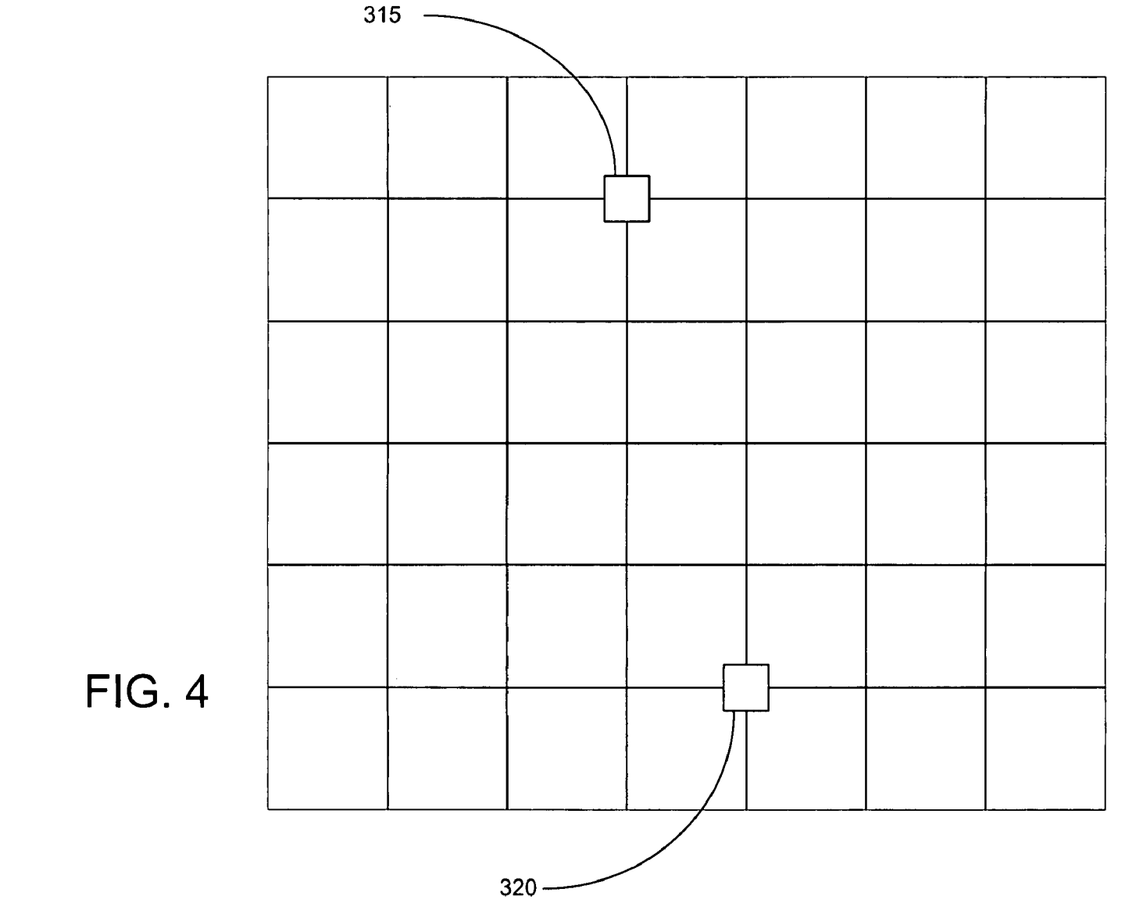
FIG. 4 is an illustration of a map indicating positions of different elements in the image of FIG. 3.

In FIG. 2, at block 200, an image 300 may be reviewed for a label (for example 305 or 310 in FIG. 3) related to an element 315 in FIG. 4. As mentioned previously, the image 300 may be a photograph, an illustration or a combination of various images 300. In one embodiment and not a limitation, the image 300 may be a photograph. The image 300 may be in two or three dimensions.

The image 300 may have elements 315, 320. Elements 315, 320 may be considered recognizable features in the image 300. Examples (and not limitations) may include streets, buildings, roads, waterways, golf courses, parks, bridges, billboards, sports stadiums, etc. Other elements 315, 320 are possible and are contemplated.

The labels 305, 310 may be stored as metadata with the image 300 or may be added as part of the image 300. In either case, the image 300 is reviewed for labels 305, 310, including labels 305, 310 that are associated with an element 315, 320. For example, a name (label) 305, 310 may be attached to a building (element) 315, 320 and the label 305, 310 may be assumed to be associated with the element 315, 320. The association may occur by the placement of the label 305, 310 over the element 315, 320 or the label 305, 310 may be expressly associated with the element 310.

The label 305, 310 may be created by a user or may be created by an application. For example, a user may add a label 305, 310 to a photo to recall information regarding the photo. In another embodiment, the label 305, 310 may be added by an application. The application may compare the elements 315, 320 to a known data store of elements 315, 320 and the application may attempt to match the elements in the image 300 to the elements 315, 320 in the data store.

Additional information in the image 300 may be used to limit the possible labels 305, 310. For example, if a photo has metadata that indicates that it was taken in San Francisco, Calif., only elements in San Francisco Calif. will be reviewed. In another embodiment, GPS information may be obtained by a camera and may be stored as part of an electronic image. In this way, the number of potential matching images may be reduced. Other data may include the lens type, the focal length, the distance measured for focus purposes and any other relevant data. Of course, additional image data is possible.

At block 205, the image 300 may be reviewed for an additional labeled element. The image 300 may have a number of elements and at block 205, an element separate from the element in block 200 is located. If numerous elements 305 310 are located, a selection process may occur to select the element 305 310 that may be the most useful. In one embodiment, the largest element 305 310 may be the most useful and in another embodiment, an element 305 310 that is furthest from the element in block 200.

At block 210 a known element data store may be evaluated to determine whether a known element in the known element data store is sufficiently similar to the labeled element 305. The known element data store may contain element names and related global positions of the known elements. The data store also may have common variations of element names such as slang names or past names of buildings. For example, the Amoco Building is currently known as the Aon Building but the name Amoco Building may also be recognized as indicating the same building. As another example (not shown), the label 305, 310 of "Corncob" may indicate the Marina Towers Building in Chicago (which some say resembles a corncob). In addition, common misspelling may also be recognized by many known algorithms such as determining the amount of matched letter or matching a series of letter or a few of the letters. Of course, other ways of matching the labels to the elements in the data store are possible and are contemplated. On some embodiments, the possible matching names from the data store are presented to a user such that a user may select the name that is most appropriate.

The global positions of the elements may be formed in a variety of ways. In one example and not limitation, the global positions may be latitude and longitude positions on Earth. In yet another embodiment and limitation, the global position may be established using street, city and country names. Of course, other manners of establishing a global position on a sphere are possible and are contemplated.

At block 215, if the data store contains a sufficiently similar known element to the labeled element, the global position of the known element may be obtained. In one embodiment, the global position is part of the data store. In another embodiment, the global positions may be stored remotely and may be accessed when a of the known element is established.

At block 220, the additional labeled element may be compared to the known element data store to determine if a sufficiently similar additional known element to the additional labeled element is in the data store. Similar to the comparison at block 310, the additional labeled element is compared to the data store in an attempt to find a match and names that are similar or that are common misspellings of the elements may be returned where the desired name may be assigned or may be selected by a user.

At block 225, if a sufficiently similar element to the additional labeled element is in the known element data store, obtaining the global position of the additional known element. Similar to block 215, the global position may be in a variety of forms such as latitude and longitude, GPS, or street and city. Of course, other methods are possible and are contemplated.

Figure 5:
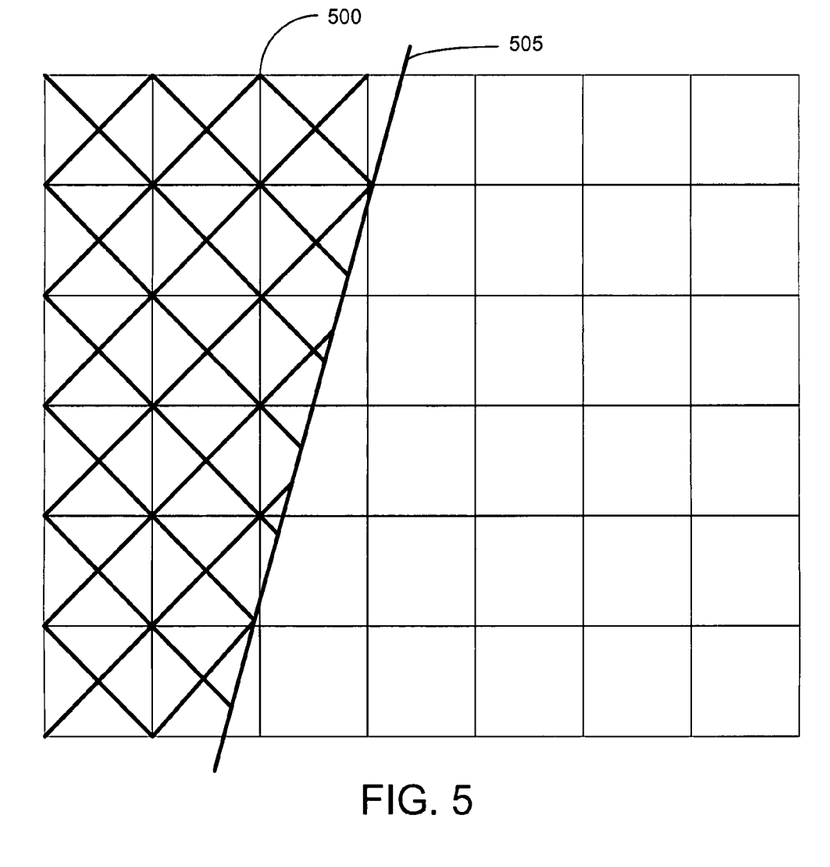
FIG. 5 is an illustration of a map indicating a possible image region.

At block 230, the global position of the known element and the additional known element may be evaluated to determine an image region 500 wherein the image region 500 comprises a geographic area from which the image 300 was created. The analysis of block 230 to create the image region 500 may take a variety of forms. In one embodiment, the image 300 may be reviewed and the location of the first labeled element may be compared to the relative position of the additional labeled element such as (and not limitation) that the labeled element is to the left of the additional labeled element. If the labeled element is left of the additional element, half the image 300 may be eliminated as being the image region 500. For example, referring to FIG. 4, Columbia can be seen as being to the left of Brooklyn. There are a limited number of locations from which Columbia appears to the left of Brooklyn. Referring to FIG. 5, a line 505 may be drawn from Brooklyn to Columbia and it is established that only the left side of the left is the possible image region 500 (cross-hatched) as the left side of the line are the only locations from which Columbia is to the left of Brooklyn. Accordingly, half the possible sites may be eliminated as being the image region 500. This technique is known as half space culling.

Blocks 200, 205, 210, 215, 220, 225 and 230 may be repeated for additional pairs of labeled elements, to further eliminate regions. By further eliminating regions, the possible locations may become progressively more narrow and precise.

At block 235, additional labels 305, 310 may be added to the image 300 by using geospatial data and building recognition to add labels to additional recognized buildings. For example, say an image region 500 of a photo of Chicago has established that the photo was taken from an area near Lake Michigan and Grant Park. From this view, only certain building may be visible. An attempt may be made to add labels 305, 310 the buildings that are visible from the image region 500. In addition, buildings in areas that are not visible may be eliminated from consideration, thereby speeding the process of analysis.

In some embodiments, the labels 305, 310 are compared to names in the data store and the names may be corrected. For example, a typo such as "the Sears Building" may be changed to "the Sears Tower" or the "the Seares Tower" may be changed to "the Sears Tower." In some embodiments, suggested changed may be presented to a user where the user may select to approved the changes. For example, a user may wish to add labels 305 310 to buildings by their architect and this label 305, 310 will unlikely be a match to the data store. If the labeled element 315 or additional labeled element 320 is not sufficiently similar to the known elements in the known element data store, the labeled element 315 or additional labeled element 320 may be ignored or the user may be asked to select a label 305 310 from a plurality of similar labels 305, 310.

User preferences also may be used to determine what elements 315 320 to add labels 305 310. Labeling all elements 315 320 or buildings likely would result in an image 300 that was difficult to view or comprehend. Accordingly, only some of the elements 315 320 or buildings may be labeled. In one embodiment, only the elements 315 320 buildings that are established as being the most popular will have labels 305 310. In another embodiment, a user can select the elements 315 320 that should receive labels 305 310. In another embodiment, a user may indicate areas of interest and the elements that are closest to the area of interest may receive labels 305 310. Of course, there are a variety of manners to determine which elements 315 320 to receive labels 305 310.

The actual adding labels 305 310 to elements 315 320 such as buildings may occur in many ways. In one, the shadow or silhouette of the elements 315 320 may be compared to known silhouettes of buildings. In another embodiment, the global position of the labeled element 315 and additional labeled element 320 are used as a frame of reference to establish the position of other buildings in the image 300 in relation to the labeled element 315 and the additional labeled element 320. Of course, a combination of these techniques also may be used and is contemplated.

At block 240, if the labeled element 315 and additional labeled element 320 are accurately labeled, the image 300 may be stored as an approved tagged image. By an approved tagged image, the elements 315 320 that were labeled were matched in the data store, the image region 500 was determined and the labels were acceptable. The image 300 may be stored where it may be used for a variety of purposes. In one embodiment, it may be used by others planning a trip to the place in the image 300. In another embodiment, the image 300 may be used to show an up-to-date view of the elements 315, 320 in the image 300. For example, the skyline in many cities is always changing with new building being built and old building being torn down. Recent labeled photos may be used to help label other photos of the same location in the image. The uses and options for what to do with an approved image 300 are virtually endless.

In another embodiment, additional elements 315, 320 may be receive labels 305 310. In one embodiment, all the elements 315, 320 that can be identified are evaluated in view of the known element data store. As can be logically inferred, the more sites that can be identified and located, the more sites that may be eliminated as being the images region. The method may repeat and search for additional labels.

In addition, the multiple elements 315 320 with labels 305 310 may be used to determine if all the labeled elements 315 320 are labeled correctly. For example, a photo may be taken from Lake Michigan toward the city of Chicago. In the center with be the Aon Building, on the left will be the Sears Tower and on the right will be the John Hancock Building. However, the Sears Tower and John Hancock Building are often confused. Accordingly, the buildings may be mislabeled. By analyzing the photo and realizing that an image region 500 that has the Sears Tower on the right and the John Hancock Building on the left would have Lake Michigan in the background. Accordingly, if an image 300 has the John Hancock Building on the left and the Sears Tower on the right and Lake Michigan is not in the background, it is likely that the buildings 315 320 have received labels 305 310 in error. In addition, the image region 500 may be used to further determine whether buildings 315 320 have received a label 305 310 in error as known building will have a predictable relation to each other based on the image region 500. In one embodiment, the mislabeling will be corrected automatically. In another embodiment, the user may be asked if the user desires to correct the label 305 310. In a similar manner, the labeling of elements 315 320 may be determined to be correct by reviewing the labels 315 320 in view of known locations of the elements from the view of the image area 500.

Other elements may be used to further specify the image area 500. The scale of elements in the image 300 may be used to better establish the image region 500. As an example, building closer to the image region 500 will appear larger than building further from the image region 500. By comparing the relative size of buildings compared to their known sizes, additional data may be gathered for determining the image region 500.

Another element that may be reviewed to further specify the 500 region is to evaluate regions from which it is possible to take an image. As an example, an image 300 is of building facades in Chicago. Looking west from Lake Michigan toward the city of Chicago presents many building facades. However, standing at the United Center in the west side of Chicago, the same building facades are not visible. Accordingly, the west side of Chicago may not be reviewed as being the image region 500.

Relevant camera data may also be used to better establish the image region 500. Some cameras have a GPS receiver and GPS data related to the image origin 300 may be stored as metadata to the electronic photo. The GPS data may be used to precisely establish the image region 500. In addition, other relevant camera data may be used. For example, the lens type, the focal length and image angle all may be created and stored with the digital image. If the lens is known and the focal length is known, math may be used to establish the length a photo was taken from an object. The height and width of the image 300 and the elements 315 320 of the image 300 also may be used in combination with the lens information (focal length, lens information) to determine a distance from a known element 315 320. For example, the height of the Sears Tower is known and the height of the Sears Tower in a photo may be used to determine an image distance if the relevant camera lens information is known.

Similarly, the relative size of the elements 315 320 in a photo can be used with the global position of the elements 315 320 to estimate a focal length of the image. For example, the height of the Sears Tower is known as is the height of the John Hancock Building. By comparing the height of the Sears Tower to the height of the John Hancock Building along with the distance each building is from each other, an estimate of the focal length may be determined.

One way to calculate the image position is to use an energy function (E(c)) such as:

$$E(c) = \text{Summation}(Pc(Li) - Ni)^2$$

Where c=camera parameters desired (position, orientation, focal length)

Pc is a projection function that projects its argument into screen space;

Li is landmark latitude and longitude position;

Ni is notation or label 305, 310 position in the image;

Solving for c involves using a standard constrained nonlinear equation. The energy is assumed to be Gaussian and the result is a maximum likelihood estimation of the camera parameters similar to a least squares estimation of finding the camera parameters. Unlike previous techniques which directly optimize the above energy function, our technique also contains constraints on the possible positions of the camera based on the half-space culling described earlier.

In another embodiment, several images may be oriented relative to each other, using matching between images. This process, such as, for example, done by PhotoSynth from Microsoft, or by panorama stitching, constraints the relative positions of the images. A set of annotations spread along those images may be used to position the whole system of images, even if each image by itself does not have the required amount of annotations for geo positioning. In conclusion, the image region 500 may make it easier to identify additional elements 315 320 in an image 300 and verify that elements 315 320 that have labels 305 310 are labeled correctly. Data stored with an image or data calculated from the image 300 may assist in determining relative locations of elements 315 320 in the image and the location of other elements may be determined by referring to a global position data store.

The invention claimed is:

1. A method of geotagging photographs using annotations comprising:
   reviewing an image for a labeled element wherein the labeled element comprises one or more selected from a group comprising street signs, buildings, billboards, cars, transportation elements;
   reviewing the image for an additional labeled element;
   using the global position of the elements, the relative size of the elements and a width of the image to estimate a focal length of the image;
   evaluating a known element data store to determine whether a known element in the known element data store is sufficiently similar to the labeled element;
   if the data store contains a sufficiently similar known element to the labeled element, obtaining the global position of the known element;
   comparing the additional labeled element to the known element data store to determine if a sufficiently similar additional known element to the additional labeled element is in the data store;
   if a sufficiently similar element to the additional labeled element is in the known element data store, obtaining the global position of the additional known element;
   evaluating the global position of the known element and the additional known element to determine an image region wherein the image region comprises a geographic area from which the image was created;
   adding additional labels to the image by using geospatial data and building recognition to add labels to additional recognized buildings; and
   if the labeled element and additional labeled element are accurately labeled, storing the image as an approved tagged image.

2. The method of claim 1, where the known element data store comprises element names and related global positions of the known elements.

3. The method of claim 1, further comprising if the labeled element or additional labeled element is not sufficiently similar to the known elements in the known element data store, ignoring the labeled element or additional labeled element.

4. The method of claim 1, further comprising repeating the method until all labeled elements are evaluated in view of the known element data store.

5. The method of claim 4, further comprising using additional labeled elements to further specify the image region.

6. The method of claim 5, further comprising using half space culling to further specify the image region.

7. The method of claim 5, further comprising using a scale of elements in the image to further specify the image region.

8. The method of claim 5, further comprising further specify the image region by evaluating regions from which it is possible to take an image.

9. The method of claim 1, further comprising adjusting the labeled elements to have labels that exactly match the labels in the known element data store.

10. The method of claim 1, further comprising determining if the labeled element and additional labeled element are accurately labeled by evaluating the relative position of the global position of the known element and the additional known element from a perspective of the image region.

11. The method of claim 1, wherein global position comprises one selected from a group comprising latitude and longitude and global positioning location information.

12. The method of claim 1, further comprising using one selected from a group comprising image metadata and image headers to further determine the focal length and image angle.

13. The method of claim 1, wherein the user selects the elements desired to be labeled.

14. A non-transitory computer storage medium comprising:
   computer executable instructions to configuring a processor, the computer executable instructions comprising instructions for geo-tagging photographs using annotations, the instructions comprising instructions for:
   Reviewing an image for a labeled element wherein the labeled element comprises one or more selected from a group comprising street signs, buildings, billboards, cars, transportation elements;
   Reviewing the image for an additional labeled element;
   Using the global position of the elements, the relative size of the elements and a width of the image to estimate a focal length of the image;
   Evaluating a known element data store to determine whether a known element in the known element data store is sufficiently similar to the labeled element;
      If the data store contains a sufficiently similar known element to the labeled element, obtaining the global position of the known element;
   Comparing the additional labeled element to the known element data store to determine if a sufficiently similar additional known element to the additional labeled element is in the data store;
      If a sufficiently similar element to the additional labeled element is in the known element data store, obtaining the global position of the additional known element;
   Evaluating the global position of the known element and the additional known element to determine an image region wherein the image region comprises a geographic area from which the image was created;
   Adding additional labels to the image by using geospatial data and building recognition to add labels to additional recognized buildings; and
      If the labeled element and additional labeled element are accurately labeled, storing the image as an approved tagged image.

15. The non-transitory computer storage medium of claim 14, where the known element data store comprises element names and related global positions of the known elements.

16. The non-transitory computer storage medium of claim 14, further comprising computer executable instructions for repeating the method until all labeled elements are evaluated in view of the known element data store.

17. The non-transitory computer storage medium of claim 16, further comprising computer executable instructions for further specifying the image region comprising at least one selected from a group comprising:
   using additional labeled elements;
   using half space culling;
   using a scale of elements in the image; and
   evaluating regions from which it is possible to take an image.

18. The non-transitory computer storage medium of claim 14, further comprising computer executable instructions for determining if the labeled element and additional labeled element are accurately labeled by evaluating the relative position of the global position of the known element and the additional known element from a perspective of the image region.

19. The non-transitory computer storage medium of claim 14, wherein global position comprises one selected from a group comprising latitude and longitude and global positioning location information.

20. The non-transitory computer storage medium of claim 14, further comprising computer executable instructions for using one selected from a group comprising image metadata and image headers to further determine the focal length and image angle.

* * * * *